(12) United States Patent
Batni

(10) Patent No.: US 9,690,764 B1
(45) Date of Patent: Jun. 27, 2017

(54) DELIVERY AND DISPLAY OF PAGE PREVIEWS USING SHADOW DOM

(71) Applicant: Amazon Technologies, Inc., Seattle, WA (US)

(72) Inventor: Dhruva Lakshmana Rao Batni, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 144 days.

(21) Appl. No.: 14/568,686

(22) Filed: Dec. 12, 2014

(51) Int. Cl.
*G06F 17/21* (2006.01)
*G06F 17/22* (2006.01)

(52) U.S. Cl.
CPC ........ *G06F 17/2247* (2013.01); *G06F 17/211* (2013.01); *G06F 17/212* (2013.01)

(58) Field of Classification Search
CPC . G06F 17/212; G06F 17/211; G06F 17/30899
USPC .................. 707/E17.122, E17.134
See application file for complete search history.

(56) References Cited

U.S. PATENT DOCUMENTS

| | | | | |
|---|---|---|---|---|
| 2001/0037359 | A1* | 11/2001 | Mockett | G06F 17/30867 709/203 |
| 2007/0282945 | A1* | 12/2007 | Bisht | G06F 17/30902 709/203 |
| 2014/0136942 | A1* | 5/2014 | Kumar | G06F 17/30902 715/229 |
| 2014/0136951 | A1* | 5/2014 | Kumar | G06F 17/30902 715/234 |
| 2014/0136971 | A1* | 5/2014 | Kumar | G06F 17/30902 715/273 |
| 2014/0136973 | A1* | 5/2014 | Kumar | G06F 17/30902 715/274 |
| 2014/0304588 | A1* | 10/2014 | Li | G06F 17/30905 715/234 |
| 2016/0170953 | A1* | 6/2016 | Maddali | G06F 17/30896 715/234 |

OTHER PUBLICATIONS

Shadow DOM W3C Working Draft, http://www.w3.org/TR/2014/WD-shadow-dom-20140617/, Jun. 17, 2014.

* cited by examiner

*Primary Examiner* — Mohammed-Ibrahim Zuberi
(74) *Attorney, Agent, or Firm* — Knobbe Martens Olson & Bear LLP

(57) ABSTRACT

A content server retrieves the code and other content of a page and generates a preview of the page. The page preview could be an image that depicts a snapshot of the page, such as a screenshot, or an image map that includes links selectable by a user. The content server further modifies the original code used to load the page such that the modified code instructs a browser application to render and display the page preview for a first period of time and to render and display the actual page in place of the page preview after the first period of time. The content server may use the shadow document object model (DOM) framework to provide the page preview.

28 Claims, 6 Drawing Sheets

DELIVERY AND DISPLAY OF PAGE PREVIEWS USING SHADOW DOM

BACKGROUND

When a user requests a web page or other content page via a browser, the user typically experiences a noticeable delay before the page is fully or even partially displayed. Various factors can contribute to this delay. These factors include, for example, (1) the speed of the wireless or wired connection between the user's device and the Internet, (2) the location of, and load on, the origin server that hosts the page, (3) the size of the page, including any embedded graphics, (4) whether, and the extent to which, the page includes embedded objects that need to be separately retrieved (possibly from different domains) once the page's HTML has been loaded, (5) the complexity of the page's coding, including any scripts, and (6) the processing power of the user's device. When the delay is significant (e.g., several seconds or more), the task of browsing can be frustrating for the user.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1A:
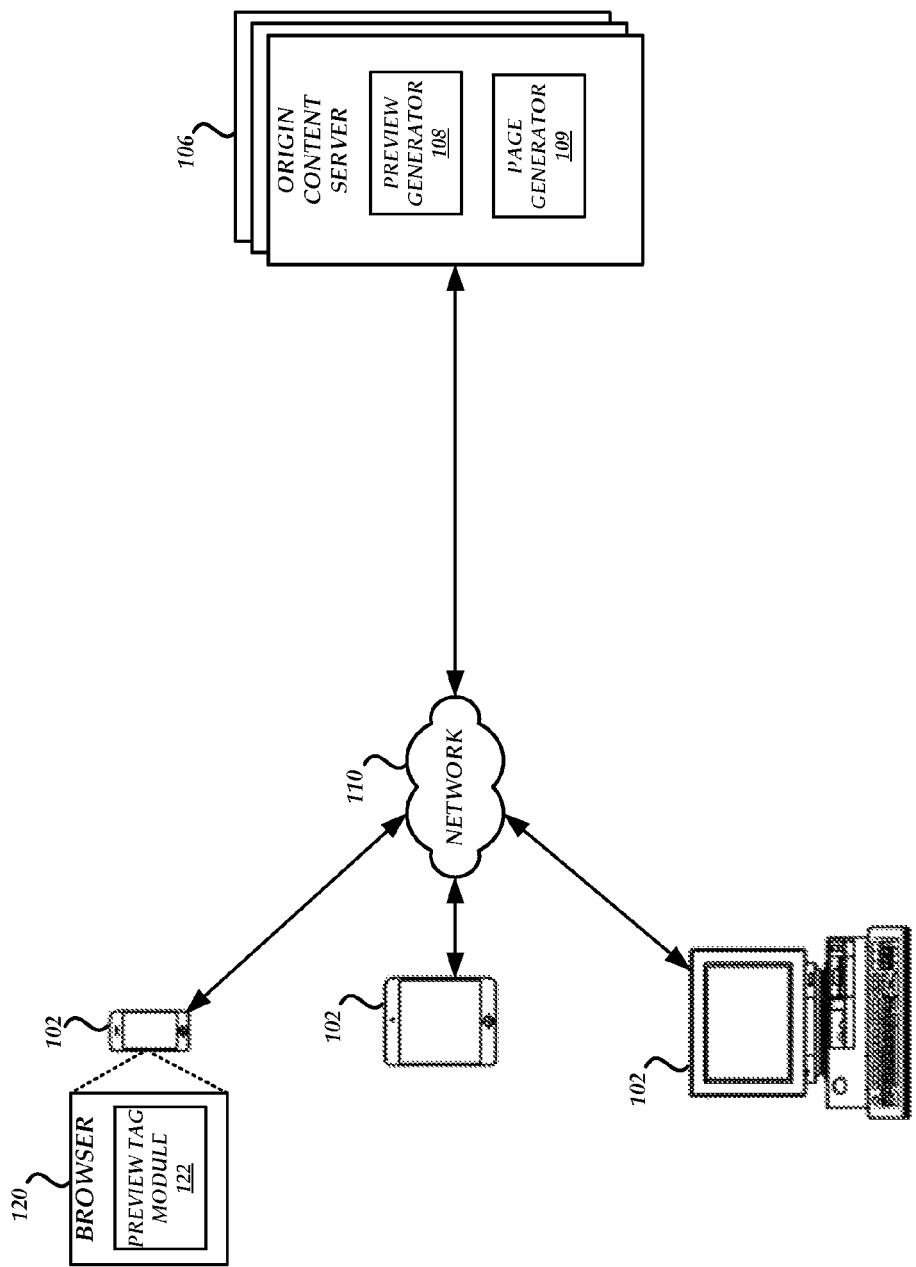
FIG. 1A illustrates a page preview environment with an origin content server that modifies the code of a page to instruct a browser application to render and display a page preview for a first period of time before rendering the actual page according to one embodiment.

One method for reducing network page or content page load times is to offload some of the processing (including rendering) to an intermediary system (e.g., a proxy system) that sits logically between the user's computing device and a system that hosts the page. For example, instead of the user's device retrieving the page (e.g., web page) directly from the system that hosts it, the intermediary system can retrieve and render the page, including loading any additional data (e.g., a library for a script, such as JavaScript, cascading style sheets (CSS), etc.) that is requested during or after the rendering process. As another example, the intermediary system can retrieve the code of the page (e.g., HTML, XHTML, XML, etc.) from the system that hosts the page, parse the code, retrieve script libraries as indicated by the parsed code, and transmit the parsed code and script libraries to the user's device so that the user's device can render and display the page.

However, even using the techniques described above, the page load times may be higher than desired. For example, if the intermediary system has to retrieve a large amount of content in order to render the page, there may still be a noticeable delay between when the page is requested and when the page is displayed to the user. Thus, the retrieval of content, especially content having large file sizes, can negatively affect the page load time.

Accordingly, the embodiments described herein present systems and methods for providing users with page previews during page loading events, such that the delay experienced before the display of page content is reduced. The systems disclosed herein may be implemented partly or wholly within a content or origin server and/or within an intermediary system that sits logically between user devices and content servers. In other embodiments, the systems disclosed herein may be implemented by a content delivery network (CDN). The systems and methods disclosed herein may be compatible with existing browser applications without the need for any browser modifications, or may be used with a modified browser application that includes special program code for providing page previews.

According to one embodiment, to provide a page preview, a content server (1) retrieves the code (and other content) of a page (e.g., from a local data store), (2) generates a preview of the page (e.g., an image that depicts a snapshot of the page, such as a screenshot), and (3) modifies the code used to load the page such that the modified code instructs a browser application to render and display the page preview for a first period of time and to render and display the actual page in place of the page preview after the first period of time. In some embodiments, the modified code causes the browser application to take advantage of the shadow document object model (DOM) framework in order to provide the page preview. The shadow DOM framework is implemented in some or all existing browser applications, such as WebKit-powered browser applications (e.g., Safari, Chrome, etc.). For example, browser applications generally parse code to load a page. While parsing the code, the browser application may generate a DOM representation of the content of the page (e.g., a DOM tree). A DOM tree typically includes various nodes that each represent an element to be displayed in the page (e.g., a tag, such as an HTML tag, that indicates tables, links, images, videos, etc.). The page can eventually be rendered based on a traversal of the DOM tree.

The shadow DOM framework, however, causes the browser application to render a page based on a selective traversal of the DOM tree. Modification of the original code may cause the generated DOM tree to include a shadow DOM tree in addition to the regular DOM nodes. For example, modification of the original code may include the insertion of an HTML tag (e.g., a newly defined tag understood by modified browser applications, such as a "preview" tag) that is associated with the shadow DOM framework. The root of a shadow DOM tree is referred to herein as a "shadow root node" and any regular DOM node can host the shadow root node (e.g., any regular DOM node can serve as a parent node to a shadow root node). A regular DOM node that hosts a shadow root node is referred to herein as a "shadow host node." Thus, a DOM node functioning as a shadow host node may have its normal DOM child nodes and one or more shadow DOM child nodes. When encountering a shadow host node, the browser application traverses the shadow DOM child nodes, not the regular DOM child nodes, and renders the page based on the traversal.

In an embodiment, as disclosed herein, the code of the page is modified such that a root element of the DOM tree (e.g., the root node of the DOM tree, a node below the root node of the DOM tree, etc.) is the shadow host node and the shadow root node is an element that references the page preview (e.g., an image element that references the image that depicts a snapshot of the page). The children of the shadow host node may then be the shadow root node and the DOM nodes generated based on a parsing of the original page code. Thus, the browser application may traverse just the shadow root node and render the page preview.

The code of the page may be further modified to include a time value associated with the shadow DOM tree. The time value may indicate how long the page preview should be displayed before the page preview is replaced with a rendering of the actual page. For example, the HTML tag that is associated with the shadow DOM framework may include an indication of the time value. The time value may be set such that the browser application has a sufficient amount of time to retrieve content for loading the page. As an example, the browser application may set a timer corresponding to the time value to begin once the page preview is displayed. Alternatively, instead of including a time value, the code of the page may be further modified to indicate that the page preview should be displayed until an event occurs (e.g., a mouse click, a key selection, a message is received from another program or thread, etc.). Once the timer expires or the specified event occurs, the browser application may delete the shadow host node and connect the regular DOM child nodes of the shadow host node to the parent node of the shadow host node. The shadow root nodes (and its child nodes) may also be deleted or may remain in the DOM tree (but have no parent node and thus not be reachable based on a traversal of the DOM tree). Alternatively, instead of deleting the shadow host node, the browser application may perform a swap such that the shadow root node and its children are changed to be the DOM nodes generated based on a parsing of the original page code. Because the DOM tree is modified, the browser application begins the process of re-rendering the page. In this case, none of the shadow DOM nodes are traversed. Rather, the DOM nodes generated based on a parsing of the original page code are traversed. Thus, the browser application renders the page.

The content server may provide the modified code to a user device when a user device requests a page for which a preview exists. The browser application of the user device may then act as described herein.

Alternatively, an intermediary system may provide the modified code to the user device when the user device requests the page for which a preview exists. For example, the content server may provide the original code and the page preview image to the intermediary system. The intermediary system may modify the original code to include the shadow DOM framework and reference the page preview image as described above, and provide the modified code to the user device. The content server may also provide the modified code directly to the intermediary system and the intermediary system may forward the modified code to the user device.

When the browser application transitions from displaying the page preview to displaying the actual page, the browser application may automatically synchronize any actions performed by the user. For example, a user may scroll vertically and/or horizontally while viewing the page preview, the user may change the zoom level while viewing the page preview, and/or perform similar actions. Because the browser application merely modifies the DOM tree and re-renders the page according to the elements of the DOM tree once the page preview should no longer be displayed (rather than, for example, retrieving new or additional content that results in the generation of a new DOM tree), the actions performed by the user are preserved without any additional communication between the user device and another entity (e.g., the content server, the intermediary system, etc.) and without any additional actions performed by the browser application (e.g., recording actions performed by the user and re-applying those actions when the actual page is displayed). Thus, if the user scrolls, changes the zoom level, and/or performs a similar action while viewing the page preview, the browser application may render and display the actual page such that the user is viewing the same content as when the page preview was displayed. Accordingly, the browser application may transition from the page preview to the actual page in a manner that is not noticeable to the user.

In some embodiments, the image that functions as a page preview is an image map (e.g., an HTML image map, an image map of a proprietary format, etc.) or a portion of the page preview is an image map. The image map may be an image that includes code (such as HTML code) that enables users to select links depicted in the screenshot and access the linked content. Image maps are described in greater detail in U.S. patent application Ser. No. 13/841,148, titled "DELIVERY AND DISPLAY OF PAGE PREVIEWS DURING PAGE RETRIEVAL EVENTS" and filed on Mar. 15, 2013, the disclosure of which is hereby incorporated herein by reference in its entirety. The content server may generate the image map. Alternatively, the intermediary system (if present) may generate the image map. For example, the intermediary system may generate the image map based on the original code and the page preview image provided by the content server. As another example, the intermediary system may generate the image map by rendering the page using the original code and taking a snapshot of the rendered page. If the image map is in a proprietary format, the browser applications can include special code to parse the image map.

While the disclosure provided herein is directed to page previews, this is not meant to be limiting. The techniques described herein can also be applied for the delivery of third party content requested by a user device or provided to a user device when a user visits a page. For example, the third party content may generally be displayed on a user device after the user attempts to visit a page and before the page is displayed. The techniques described herein can be used to instruct a browser application to provide a preview of the third party content for a period of time and then display the actual third party content after the period of time.

System Components

FIG. 1A illustrates a page preview environment with an origin content server that modifies the code of a page to instruct a browser application to render and display a page preview for a first period of time before rendering the actual page according to one embodiment. The origin content server may modify the code of a page to instruct a browser application to render and display a page preview if the browser application is configured to support the shadow DOM framework. If a browser application does not support the shadow DOM framework, the origin content server may provide the original code for rendering the page. The page preview environment shown in FIG. 1A includes various user devices 102 and various origin content servers 106. As will be appreciated by those of skill in the relevant art, the page preview environment may include any number of distinct user devices 102 and/or origin content servers 106.

In other embodiments, not shown, the page preview environment also includes other content sources, such as a content delivery network ("CDN") server. The system components may communicate with each other via one or more communication networks 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application 120 to communicate via the network 110 with other computing systems, such as the origin content servers 106, in order to request and display content.

Illustratively, a user may use a browser application 120 to request directly network-accessible content (e.g., content pages, images, video, etc.) hosted or provided by a content source, such as an origin content server 106 or a CDN server. The browser application 120 may be configured to generate a DOM tree that includes shadow DOM nodes (e.g., shadow host nodes, shadow root nodes, etc.) when encountering an element that references the shadow DOM framework. The browser application 120 may be further configured to (1) traverse the shadow root node and its children and not the other children of the shadow host node when rendering the page, and (2) modify the DOM tree as described above once the time period for displaying the page preview has expired (e.g., delete the shadow host node and reconfigure the DOM nodes generated based on a parsing of the original page code to be children of the parent node of the shadow host node, perform a swap such that the shadow root node and its children are now the DOM nodes generated based on a parsing of the original page code, etc.). The browser application 120 may optionally include a preview tag module 122 that includes special code to allow the browser application 120 to render pages using the shadow DOM framework. The preview tag module 122, for example, recognize a preview HTML tag as referencing a shadow DOM element and the browser application 120 may generate a DOM tree accordingly.

The origin content servers 106 and CDN servers (not shown) can correspond to logical associations of one or more computing devices for hosting content and servicing requests for the hosted content over the network 110. For example, a content server 106 or CDN server can include a web server component corresponding to one or more server computing devices for obtaining and processing requests for content (such as content pages) from user devices 102 or other devices or service providers. In some embodiments, one or more content servers 106 may be associated one or more CDN service providers (e.g., entities that manage multiple CDN servers), application service providers, etc.

An origin content server 106 may include various modules, components, data stores, and the like to provide the page preview functionality described herein. For example, the origin content server 106 may include a preview generator 108 and a page generator 109. The preview generator 108 may generate page previews of a page hosted by the origin content server 106. For example, the page preview may be an image that depicts a snapshot or screenshot of the page. The preview generator 108 may render the page using the original page code and take a snapshot of the rendered page to generate the page preview. The preview generator 108 may generate new images each time a page is updated or at regular intervals. In some embodiments, the preview generator 108 further generates an image map of the page. The page preview may itself by the image map or a portion of the page preview may be an image map. The preview generator 108 may use the generated image of the page and/or the original code of the page in generating the image map. The preview generator 108 may store generated images and/or image maps in a local data store (not shown).

The page generator 109 may modify the original code of the page to include the shadow DOM framework. For example, the page generator 109 may retrieve the original code of the page from a local data store (not shown) and insert an element (such as a preview HTML tag created specifically to be associated with the shadow DOM framework, any existing HTML tag that is associated with the shadow DOM framework, etc.) that references the image or image map generated by the preview generator 108, that references a time value indicating how long the browser application 120 should display the page preview, and/or that otherwise indicates how long the browser application 120 should display the page preview (e.g., until an event occurs). The page generator 109 may store the modified page code in the local data store. As the page changes (e.g., as the original page code changes, as the page preview changes, etc.), the page generator 109 may update the modified page code stored in the local data store accordingly. In an embodiment, when a user device 102 requests the page hosted by the origin content server 106, the page generator 109 retrieves the modified page code from the local data store and transmits the modified page code to the user device 102 over the network 110.

When the browser application 120 transitions from displaying the page preview to displaying the actual page, the browser application 120 may automatically synchronize any actions performed by the user. For example, a user may scroll vertically and/or horizontally while viewing the page preview, the user may change the zoom level while viewing the page preview, and/or perform similar actions. Because the browser application 120 merely modifies the DOM tree and re-renders the page based on a traversal of the DOM tree once the page preview should no longer be displayed (rather than, for example, retrieving new or additional content that results in the generation of a new DOM tree), the actions performed by the user are preserved without any additional communication between the user device 102 and another entity (e.g., the content server 106, the intermediary system 104 described below, etc.) and without any additional actions performed by the browser application 120 (e.g., recording actions performed by the user and re-applying those actions when the actual page is displayed). Thus, if the user scrolls, changes the zoom level, and/or performs a similar action while viewing the page preview, the browser application 120 may render and display the actual page such that the user is viewing the same content as when the page preview was displayed. Accordingly, the browser application 120 may transition from the page preview to the actual page in a manner that is not noticeable to the user.

Figure 1B:
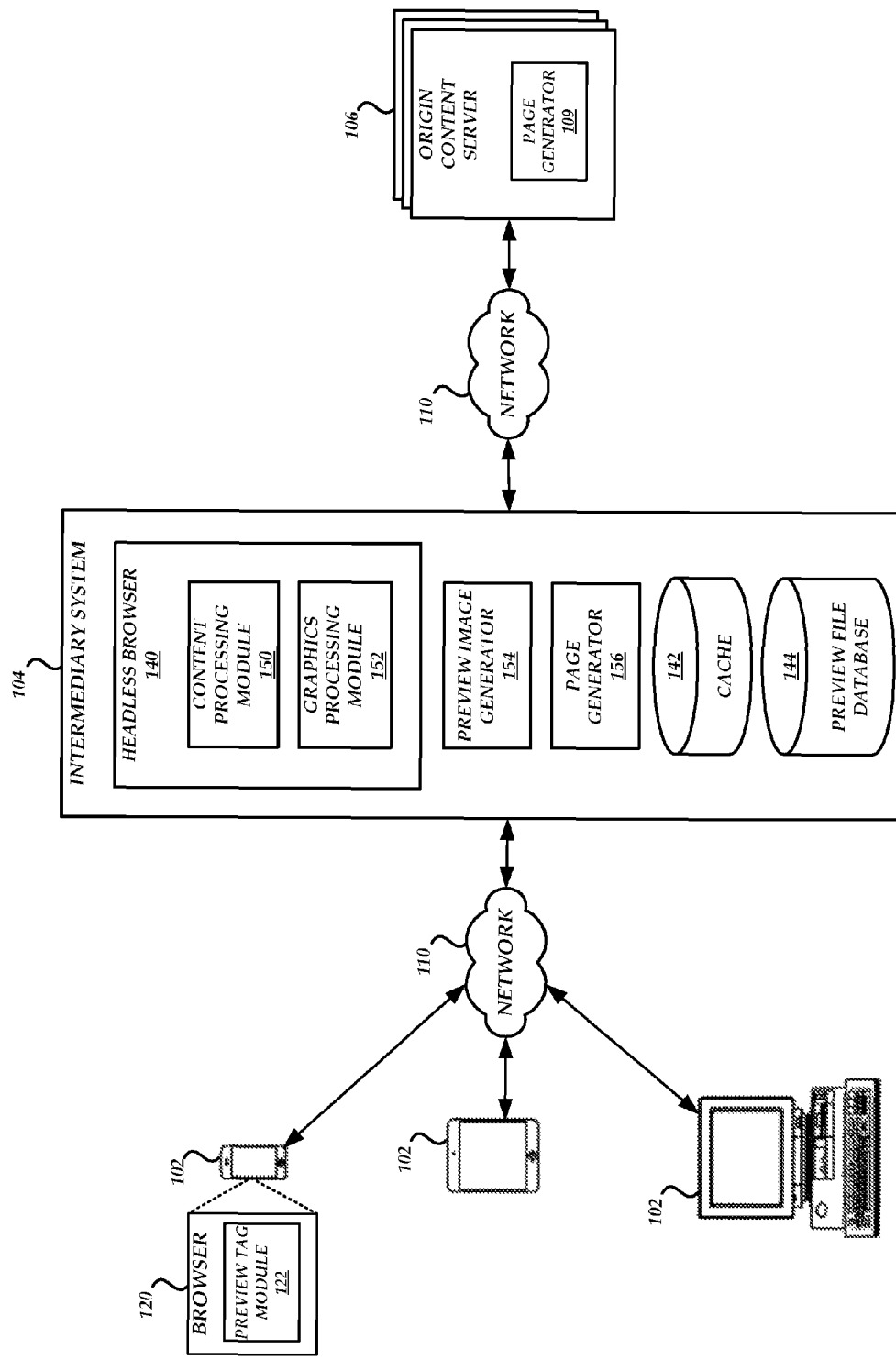
FIG. 1B illustrates another page preview environment with an origin content server and an intermediary system that modify the code of a page to instruct a browser application to render and display a page preview for a first period of time before rendering the actual page according to one embodiment.

FIG. 1B illustrates another page preview environment with an origin content server and an intermediary system that modify the code of a page to instruct a browser application to render and display a page preview for a first period of time before rendering the actual page according to one embodiment. The page preview environment shown in FIG. 1B includes various user devices 102, an intermediary system 104, and various origin content servers 106. As described above with respect to FIG. 1A, in other embodiments, not shown, the page preview environment also includes other content sources, such as a CDN server. The system components may communicate with each other via one or more communication networks 110.

As will be appreciated by those of skill in the relevant art, the page preview environment may include any number of distinct user devices 102 and/or origin content servers 106. In addition, multiple (e.g., two or more) intermediary systems 104 may be used. For example, separate intermediary systems 104 may be located so that they are close (in either a geographical or networking sense) to groups of current or potential user devices 102 or origin content servers 106. In such a configuration, a user device 102 may request content via the intermediary system 104 to which it is closest, rather than all user devices 102 requesting content via a single intermediary system 104.

As described above with respect to FIG. 1A, the user devices 102 may include a browser application 120. The user device 102 or browser application 120 may be associated with the intermediary system 104 or otherwise configured to request the content through, and receive content display commands from, the intermediary system 104 rather than communicating directly with the origin content servers 106. The browser application 120 may be configured as described above with respect to FIG. 1A. The browser application 120 may also include a remote graphics module (not shown) that receives remotely-generated display commands, such as those generated by the intermediary system 104. The remote graphics module (or some other module of the browser application 120) can execute the remote-generated display commands to display a representation of the requested content on the user device 102. Advantageously, the remote graphics module may facilitate the display of graphical representations of requested content at the user device 102 without requiring the user device 102 to receive content files (e.g., HTML files, JPEG images, etc.) directly or indirectly from the origin content servers 106. However, in some instances as described herein, the user device 102 may receive content files to increase efficiency.

In some embodiments, the browser application 120 may be a conventional web browser that is not specifically designed or configured to execute remotely-generated graphics commands and other display commands. For example, the browser application 120 may use or otherwise be associated with a remote graphics module that is not integrated with the browser application 120, such as a browser add-in or extension. In some embodiments, applications other than a browser application 120 may include or use a remote graphics module (or some similar module) to execute graphics commands generated by an intermediary system 104. For example, content aggregators or other specialized content display applications for mobile devices (e.g., Flipboard) may utilize a remote graphics module.

In some embodiments, the origin content servers 106 do not generate image maps and/or do not generate the modified code. Rather, the intermediary system 104 may perform these actions and no changes to the origin content servers 106 may be needed (e.g., the preview generator 108 and the page generator 109 may not be a part of the origin content servers 106). In other embodiments, the origin content servers 106 include the preview generator 108 (not shown) and the page generator 109 modules as described above with respect to FIG. 1A. Thus, the origin content servers 106 may generate the modified page code and transmit the modified page code and/or the page preview image or image map to the intermediary system 104 when a user device 102 requests access to the page. The intermediary system 104 may then forward the modified page code and/or the page preview image or image map to the user device 102.

The intermediary system 104 can be a computing system configured to retrieve content on behalf of user devices 102 and generate display commands for execution by the user devices 102. The intermediary system 104 can also be adapted to generate image maps and/or modify the original code of the page to include the shadow DOM framework as described herein. For example, the intermediary system 104 can be a physical server or group of physical servers that may be accessed via the network 110. In some embodiments, the intermediary system 104 may be a proxy server, a system operated by an internet service provider (ISP), and/or some other device or group of devices that retrieve content on behalf of user devices 102.

The intermediary system 104 may include various modules, components, data stores, and the like to provide the page preview functionality described herein. For example, the intermediary system 104 may include a preview image generator 154 that may generate a preview of the page by taking a snapshot of the page after the page is rendered using the original page code. In an embodiment, the graphics processing module 152 renders the page using the original page code, as described in greater detail below. The preview image generator 154 may further generate an image map using a page preview (as generated by the origin content server 106 or the preview image generator 154) and/or the original page code. The intermediary system 104 may also include a page generator 156 that may include similar functionality as the page generator 109 of the origin content server 106. For instance, the page generator 156 may modify the original page code retrieved from the origin content server 106 to include the shadow DOM framework. Furthermore, the page generator 156 may modify the original page code to reference the generated preview and/or image map. The page generator 156 may transmit the modified page code and/or the page preview (e.g., an image, an image map, etc.) to the user device 102 that requested access to the page.

Moreover, the intermediary system 104 may include a server-based browser application or some other content rendering application to process content retrieved from content sources. Such a content rendering application may be referred to as a "headless browser" 140. A headless browser 140 does not (or is not required to) cause display of content by a graphical display device of the server that on which the headless browser 140 is executing. Instead, the headless browser 140 provides display commands to separate user devices 102. Illustratively, the headless browser 140 may obtain requested content from an origin content server 106 and/or CDN server, obtain page preview images and/or image maps from the origin content server 106, obtain additional items (e.g., images, executable code files, etc.) referenced by the requested content, execute code (e.g., JavaScript, CSS, etc.) that may be included in or referenced by the content, generate graphics commands to display a graphical representation of the content, and/or transmit the graphics commands to the user device 102. Thus, rather than having the preview image generator 154 and/or the page generator 156 provide the modified page code and/or page preview to the user device 102 and having the user device 102 generate a DOM tree and render based on a traversal of the DOM tree, the headless browser 140 may use the modified page code generated by the page generator 109 or the page generator 156 and a page preview provided by the origin content server 106 or the preview image generator 154 to generate graphics commands that instruct a user device 102 to display a preview of the page for a period of time and to display the actual page after the period of time expires. By performing some or all of these operations at the intermediary system 104, the substantial computing resources and high-speed network connections typically available to network-based server systems may be leveraged to perform the operations much more quickly than would otherwise be possible on a user device 102 with comparatively limited processing capability. Although the headless browser 140 does not typically cause the display of content by a graphical display device of the server, in some embodiments, it may. For example, in some cases, a copy of content provided to a user device 102 for display may also be displayed on the graphical display device of the intermediary system 104.

The headless browser 140 may include various modules to provide the functionality described above and in greater detail below. For example, the headless browser 140 may include a content processing module 150 and a graphics processing module 152. In an embodiment, the content processing module 150 and the graphics processing module 152 are compatible with the shadow DOM framework. In some embodiments, the headless browser 140 may include additional or fewer modules than those shown in FIG. 1B. The content processing module 150 may include any system that can retrieve and parse content files associated with a content page (e.g., the code of the page, such as HTML, XHTML, XML, JavaScript, CSS, etc.) and generate a DOM representation of the content (e.g., a DOM tree including possible shadow DOM nodes).

The graphics processing module 152 may include any system that can receive the DOM representation and generate display commands (e.g., SKIA commands) to render a graphical representation of the content at a user device 102. The graphics processing module 152 may provide the display commands to the user device 102.

The intermediary system 104 may include additional modules, components, data stores, and the like to provide the features described above and in greater detail below. For example, the intermediary system 104 may include a cache 142 that stores content items received form origin content servers 106 or CDN servers, a DOM representation of a page (e.g., rendered pages), graphics commands generated by the headless browser 140, and/or the like. Information may be stored in the cache 142 when content is retrieved from the origin content servers 106 or the CDN servers. The cache 142 may also dynamically update as new content is retrieved from the origin content servers 106 or the CDN servers. For example, to render a page, the headless browser 140 may parse the code of the page (e.g., HTML, XHTML, XML, JavaScript, etc.) into a DOM representation (e.g., a DOM tree). The DOM representation can be stored in the cache 142 (e.g., as a synchronized copy of the rendered page).

The intermediary system 104 may also include a preview file database 144 that stores modified page code and/or generated image maps associated with different pages. While the preview file database 144 is illustrated as being internal to the intermediary system 104, this is not meant to be limiting. The preview file database 144 may be a data store that is external to the intermediary system 104 (e.g., a separate data store hosted by a separate device, a data store associated with a user device 102, a data store associated with the origin content server 106, etc.).

The intermediary system 104 may be a single computing device, or it may include multiple distinct computing devices, such as computer servers, logically or physically grouped together to collectively operate as a server system. The components of the intermediary system 104 can each be implemented in application-specific hardware (e.g., a server computing device with one or more ASICs) such that no software is necessary, or as a combination of hardware and software. In addition, the modules and components of the intermediary system 104 can be combined on one server computing device or separated individually or into groups on several server computing devices. In some embodiments, the intermediary system 104 may include additional or fewer components than illustrated in FIG. 1B.

In some embodiments, the features and services provided by the intermediary system 104 may be implemented as web services consumable via the communication network 110. In further embodiments, the intermediary system 104 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Example Process for Generating a Shadow DOM Preview

Figure 2:
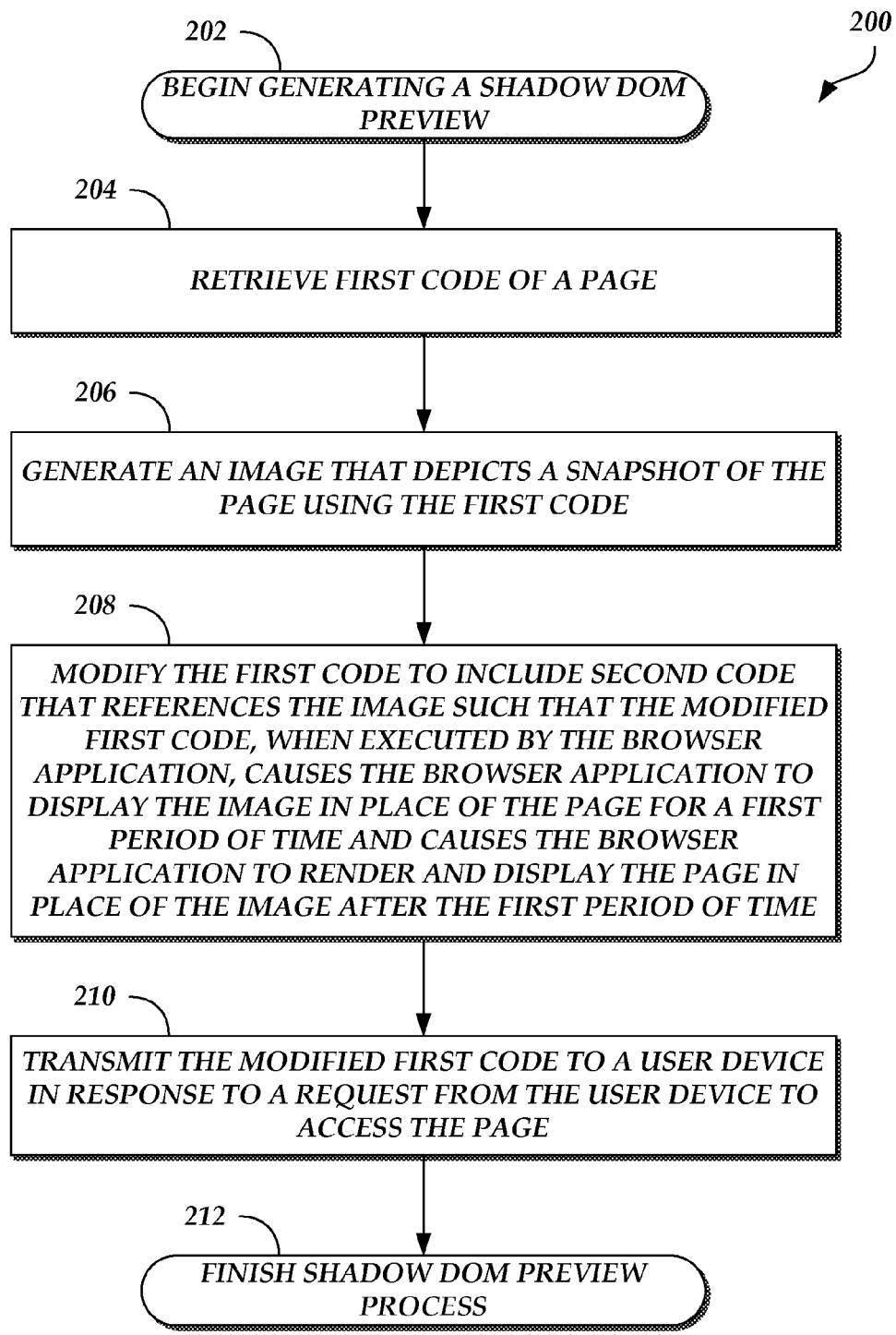
FIG. 2 illustrates a shadow DOM preview generation process that may be used by an origin content server or an intermediary system to instruct a user device to display a preview of a page for a period of time before displaying the actual page.

FIG. 2 illustrates a shadow DOM preview generation process 200 that may be used by an origin content server or an intermediary system to instruct a user device to display a preview of a page for a period of time before displaying the actual page. As an example, the origin content server 106 of FIGS. 1A-B or the intermediary system 104 (e.g., the preview image generator 154 and/or the page generator 156) of FIG. 1B can be configured to execute the shadow DOM preview generation process 200. The shadow DOM preview generation process 200 begins at block 202.

At block 204, first code of a page is retrieved. For example, the first code may be the original page code. The first code may be retrieved from a data store local to the origin content server 106 (if the origin content server 106 is performing the shadow DOM preview generation process 200) or from the origin content server 106 (if the intermediary system 104 is performing the shadow DOM preview generation process 200).

At block 206, an image that depicts a snapshot of the page is generated using the first code. For example, the page may be rendered using the first code and a snapshot may be taken of the rendered page. Rendering the page using the first code may also include retrieving images, graphics, and/or other content. In an embodiment, the image may be generated differently for different user devices 102. For example, the dimensions and resolution of the image may be selected based on a screen size, resolution, hardware configured, software configuration, and/or the like of a user device 102. In an embodiment, the image is an image map. The image map may be generated based on the first code and a screenshot of the page.

At block 208, the first code is modified to include second code that references the image such that the modified first code, when executed by the browser application, causes the browser application to display the image in place of the page for a first period of time and causes the browser application to render and display the page in place of the image after the first period of time. The second code may include an element, such as an HTML tag (e.g., a preview HTML tag), that references the shadow DOM framework. The element may reference the image and a time value corresponding to the first period of time that indicates how long the browser application should display a page preview. Alternatively, the element may reference the image and an event or events that, when one occurs, indicate to the browser application that the page preview should no longer be displayed.

At block 210, the modified first code is transmitted to a user device in response to a request from the user device to access the page. For example, the modified first code may be stored in a data store after the modified first code is generated. The modified first code may be retrieved from the data store and transmitted to the user device once the user device requests access to the page. After the modified first code is transmitted to the user device, the shadow DOM preview generation process 200 may be complete, as shown in block 212.

Example DOM Tree Manipulation by a User Device

Figure 3A:
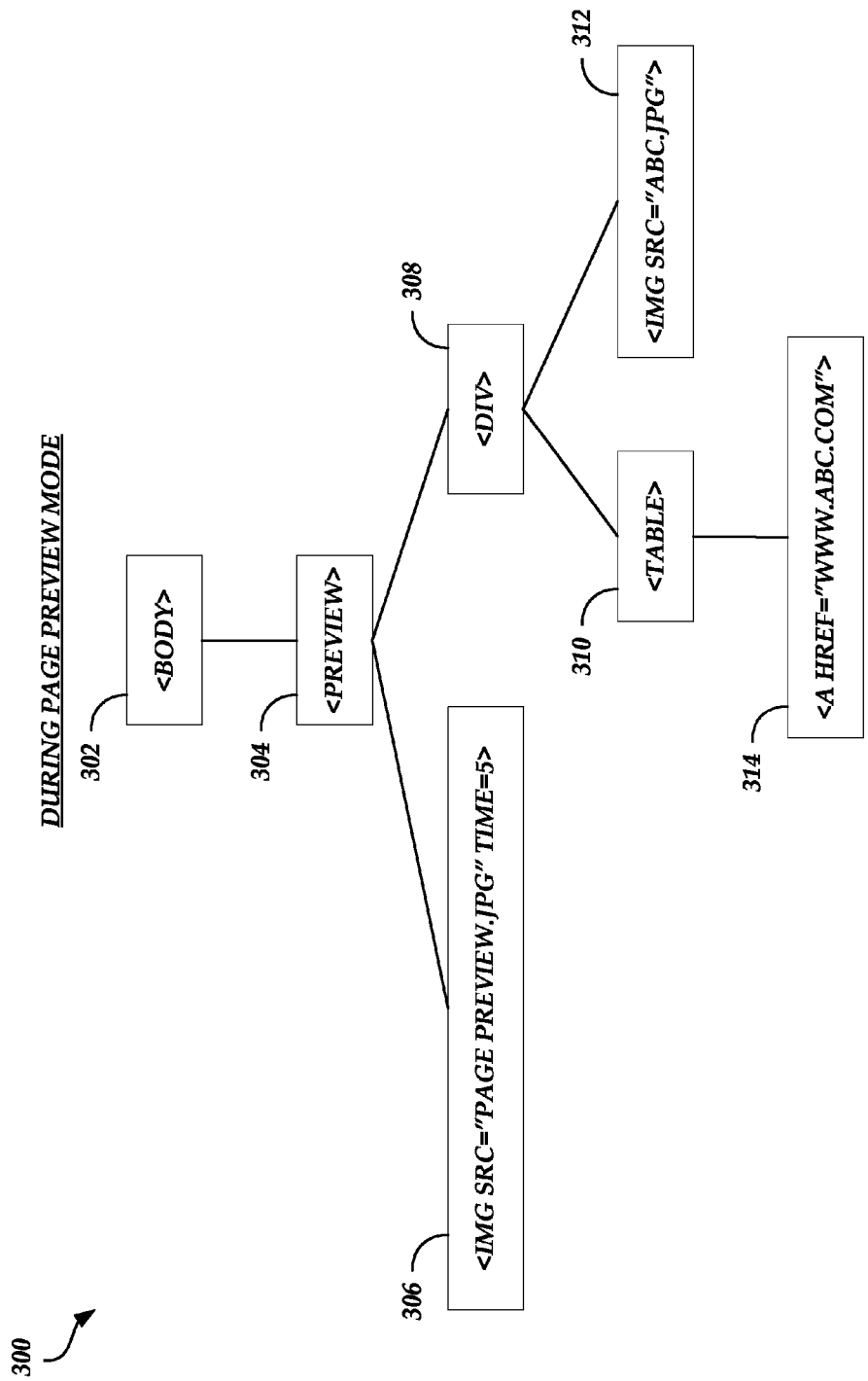
FIGS. 3A-C illustrate an example DOM tree generated by a user device, such as the user device.
Figure 3B:
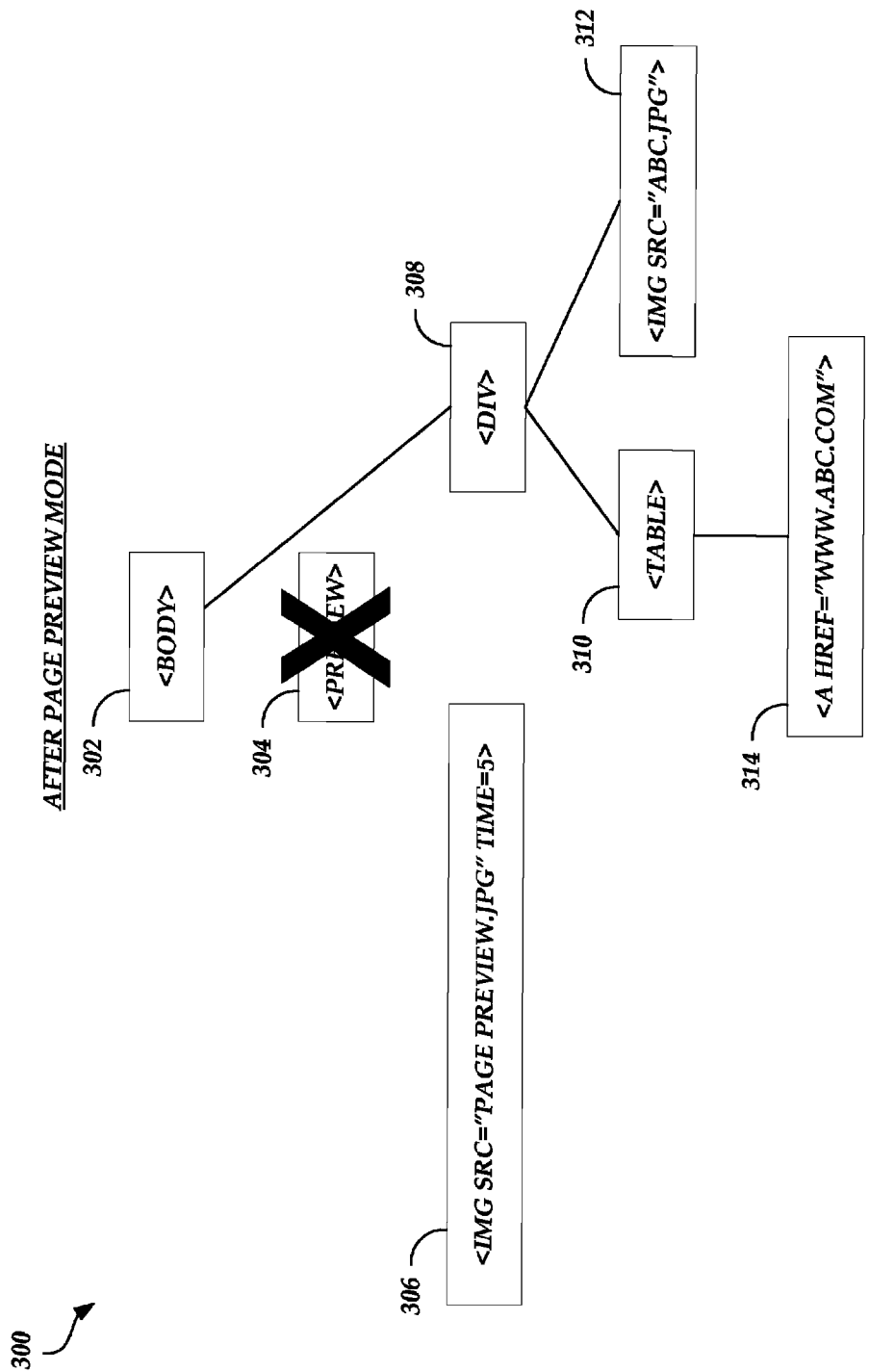
Figure 3C:
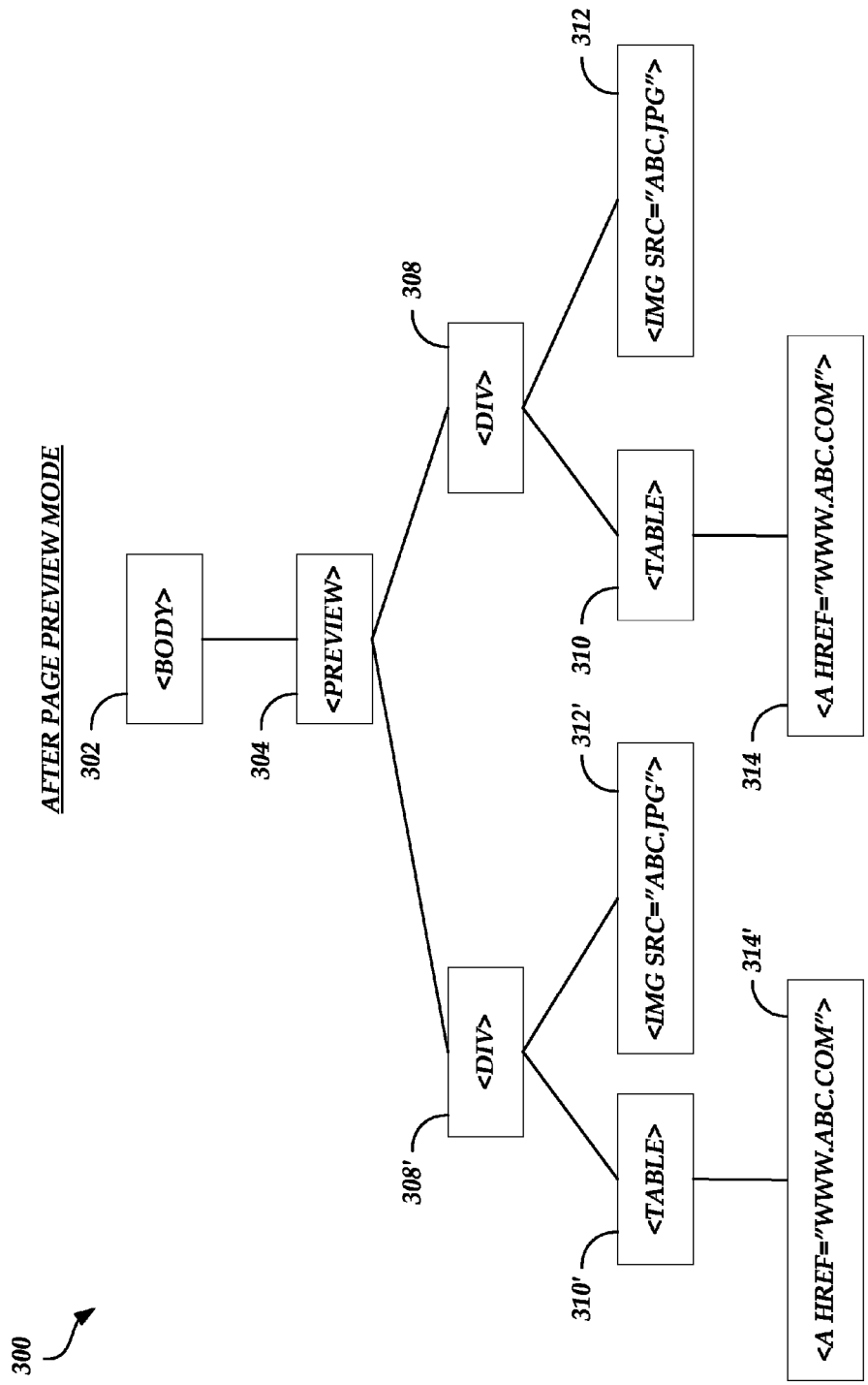

FIGS. 3A-C illustrate an example DOM tree 300 generated by a user device, such as the user device 102. The DOM tree 300 may be generated based on page code that has been modified to include the shadow DOM framework such that a browser application is instructed to display a page preview for a period of time. In an embodiment, the page code includes a preview HTML tag. Thus, the DOM tree 300 may be generated by any browser application that is configured to support the shadow DOM framework and includes special program code for supporting the preview HTML tag. However, this is not meant to be limiting. While the page code includes a preview HTML tag, the page code could include any standard tag that is associated with the shadow DOM framework. In such a situation, the DOM tree 300 may be generated by any browser application that is configured to support the shadow DOM framework. As illustrated in FIG. 3A, the DOM tree 300 is generated such that the browser application 120 of the user device 102 is displaying the page preview. The DOM tree 300 includes a body element node 302, a preview element node 304, an image element node 306, a div element node 308, a table element node 310, an image element node 312, and a link element node 314. In an embodiment, the preview element node 304 is the shadow host node and the image element node 306 is the shadow root node. Thus, nodes 308, 310, 312, and 314 are the regular DOM nodes that are generated when parsing the original page code. As described herein, because the preview element node 304 is the shadow host node, the browser application 120 traverses nodes 302, 304, and 306 only, and thus renders and displays the image referenced by the image element node 306 (e.g., "page preview.jpg").

The image element node 306 further references a time value (e.g., 5 seconds). Thus, the browser application 120 may be instructed to render and display the image referenced by the image element node 306 for 5 seconds. After 5 seconds has passed, the browser application 120 may modify the DOM tree 300 as shown in FIG. 3B or as shown in FIG. 3C.

As illustrated in FIG. 3B, the browser application 120 has deleted the shadow host node, the preview element node 304. The shadow root node, the image element node 306, no longer has a connection to the rest of the DOM tree 300. The other children of the preview element node 304, nodes 308, 310, 312, and 314, are now connected (directly or indirectly) to the parent node of the preview element node 304, the body element node 302. For example, the div element node 308, which used to be a child of the preview element node 304, is now a child of the body element node 302. Thus, the DOM tree 300 has been reconfigured such that the DOM tree 300 resembles a DOM tree that may have been created when parsing the original page code. The browser application 120 may traverse the nodes 302, 308, 310, 312, and 314 and render and display the image referenced by the image element node 312 (e.g., "abc.jpg") and a link in a table (e.g., "www.abc.com"), which is the actual page.

As illustrated in FIG. 3C, instead of deleting the shadow host node, the browser application 120 has performed a swap operation. The image element node 306 has been removed and the DOM nodes that may have been created when parsing the original page code have been included in place of the image element node 306 (e.g., nodes 308, 310, 312, and 314, now referenced as 308', 310', 312', and 314'). Thus, div element node 308', which corresponds with the div element node 308, is now the shadow root node. Because the div element node 308' is the shadow host node and nodes 310', 312', and 314' are children of the shadow root node, the browser application 120 traverses nodes 302, 304, 308', 310', 312', and 314' only. However, because nodes 308', 310', 312', and 314' are identical to the nodes 308, 310, 312, and 314, the browser application 120 renders and displays the actual page (e.g., "abc.jpg" and "www.abc.com" in a table).

TERMINOLOGY

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of generating a preview of a content page, the method comprising:
as implemented by a computer system comprising one or more computing devices, the computer system configured with specific executable instructions,
retrieving first code of a content page;
generating an image that depicts a snapshot of the content page using the first code;
modifying the first code to include second code that references the image and a first period of time, wherein the modified first code, when executed by the browser application, causes the browser application to:
generate a document object model (DOM) tree that comprises a root node, a shadow host node that is a child of the root node, a subtree that is a first child of the shadow host node, and a shadow root node that is a second child of the shadow host node, wherein the subtree includes DOM elements of the content page, and wherein the shadow root node references the image,
render the shadow root node during the first period of time,
modify the DOM tree, after the first period of time, such that the shadow host node is deleted and the subtree becomes a child of the root node, and
render the subtree after the DOM tree is modified;

transmitting the modified first code to a user device in response to a request from the user device to access the content page.

2. The computer-implemented method of claim 1, wherein the DOM tree comprises a child node that is a child of the root node, and wherein the modified first code further causes the browser application to render the child node during the first period of time.

3. The computer-implemented method of claim 2, wherein the shadow root node is rendered in a portion of the browser application that is visible to a user before the user interacts with the browser application, and wherein the child node is rendered in a portion of the browser application that is not visible to the user before the user interacts with the browser application.

4. The computer-implemented method of claim 1, wherein at least a portion of the image comprises an image map, and wherein the image map comprises interactive content selectable by a user.

5. The computer-implemented method of claim 1, wherein the modified first code causes the browser application to render the shadow root node and not the subtree during the first period of time.

6. The computer-implemented method of claim 1, wherein the computer system is a content server.

7. The computer-implemented method of claim 1, wherein the first code is HTML code.

8. A system comprising:
a computer data repository that stores code, the computer data repository comprising a storage device; and
a computing system comprising one or more computing devices, the computing system in communication with the computer data repository and programmed to implement:
a preview generator configured to retrieve first code of a content page, wherein the preview generator is further configured to generate an image that depicts a representation of the content page using the first code; and
a page generator configured to modify the first code to include second code that references the image and a time value corresponding to a first period of time that indicates how long a browser application should display the image, wherein the modified first code, when executed by the browser application, causes the browser application to display the image in place of the content page for the first period of time and to render and display the content page in place of the image after the first period of time expires,
wherein the page generator is further configured to transmit the modified first code to a user device in response to a request from the user device to access the content page.

9. The system of claim 1, wherein the modified first code further causes the browser application to:
generate a document object model (DOM) tree that comprises a root node, a shadow host node that is a child of the root node, a subtree that is a first child of the shadow host node, and a shadow root node that is a second child of the shadow host node, wherein the subtree includes DOM elements of the content page, and wherein the shadow root node references the image,
render the shadow root node during the first period of time,
modify the DOM tree, after the first period of time expires, such that the shadow host node is deleted and the subtree becomes a child of the root node, and
render the subtree after the DOM tree is modified.

10. The system of claim 9, wherein the DOM tree comprises a child node that is a child of the root node, and wherein the modified first code further causes the browser application to render the child node during the first period of time.

11. The system of claim 10, wherein the shadow root node is rendered in a portion of the browser application that is visible to a user before the user interacts with the browser application, and wherein the child node is rendered in a portion of the browser application that is not visible to the user before the user interacts with the browser application.

12. The system of claim 9, wherein the modified first code causes the browser application to render the shadow root node and not the subtree during the first period of time.

13. The system of claim 1, wherein the modified first code further causes the browser application to:
generate a document object model (DOM) tree that comprises a root node, a shadow host node that is a child of the root node, a subtree that is a first child of the shadow host node, and a shadow root node that is a second child of the shadow host node, wherein the subtree includes DOM elements of the content page, and wherein the shadow root node references the image,
render the shadow root node during the first period of time,
modify the DOM tree, after the first period of time expires, such that the shadow host node comprises the subtree, and
re-render the shadow host node after the DOM tree is modified.

14. The system of claim 1, wherein at least a portion of the image comprises an image map, and wherein the image map comprises interactive content selectable by a user.

15. The system of claim 1, wherein the computing system is a content server.

16. The system of claim 1, wherein the first code is HTML code.

17. A system comprising:
a computer data repository that stores generated content page previews, the computer data repository comprising a storage device; and
a computing system comprising one or more computing devices, the computing system in communication with the computer data repository and programmed to implement:
a content processing module configured to retrieve first code of a content page, wherein the content processing module is further configured to retrieve an image that depicts a representation of the content page using the first code; and
a page generator configured to modify the first code to include second code that references the image and a time value corresponding to a first period of time that indicates how long a browser application should display the image, wherein the modified first code, when executed by the browser application, causes the browser application to display the image in place of the content page for the first period of time and to render and display the content page in place of the image after the first period of time expires, wherein the page generator is further configured to transmit the modified first code to a user device in response to a request from the user device to access the content page.

18. The system of claim 17, wherein the modified first code further causes the browser application to:
generate a document object model (DOM) tree that comprises a root node, a shadow host node that is a child of the root node, a subtree that is a first child of the shadow host node, and a shadow root node that is a second child of the shadow host node, wherein the subtree includes DOM elements of the content page, and wherein the shadow root node references the image,
render the shadow root node during the first period of time,
modify the DOM tree, after the first period of time expires, such that the shadow host node is deleted and the subtree becomes a child of the root node, and
render the subtree after the DOM tree is modified.

19. The system of claim 18, wherein the DOM tree comprises a child node that is a child of the root node, and wherein the modified first code further causes the browser application to render the child node during the first period of time.

20. The system of claim 19, wherein the shadow root node is rendered in a portion of the browser application that is visible to a user before the user interacts with the browser application, and wherein the child node is rendered in a portion of the browser application that is not visible to the user before the user interacts with the browser application.

21. The system of claim 18, wherein the modified first code causes the browser application to render the shadow root node and not the subtree during the first period of time.

22. The system of claim 17, wherein the modified first code further causes the browser application to:
generate a document object model (DOM) tree that comprises a root node, a shadow host node that is a child of the root node, a subtree that is a first child of the shadow host node, and a shadow root node that is a second child of the shadow host node, wherein the subtree includes DOM elements of the content page, and wherein the shadow root node references the image,
render the shadow root node during the first period of time,
modify the DOM tree, after the first period of time expires, such that the shadow host node comprises the subtree, and
re-render the shadow host node after the DOM tree is modified.

23. The system of claim 17, wherein the computing system is further programmed to implement a preview generator configured to modify the image such that at least a portion of the image comprises an image map, wherein the image map comprises interactive content selectable by a user.

24. The system of claim 17, wherein the computing system is an intermediary between user devices and content servers.

25. A non-transitory computer-readable medium having stored thereon a browser component configured to run on a user device and to interact over a network with a content server, the browser component comprising executable program code that directs the user device to perform a process that comprises:
requesting a content page;
receiving code associated with the content page in response to requesting the content page, wherein the code comprises a reference to a first period of time that indicates how long the browser component should display an image;
generating a document object model (DOM) tree that references the image, wherein the image depicts a representation of the content page and references elements of the content page based on a parsing of the received code;
displaying the image during the first period of time;
modifying the DOM tree after the first period of time expires; and
rendering and displaying the content page in response to modifying the DOM tree.

26. The non-transitory computer-readable medium of claim 25, wherein the code comprises a reference to a shadow DOM tag.

27. The non-transitory computer-readable medium of claim 26, wherein the process further comprises:
generating the DOM tree to include a node corresponding to the shadow DOM tag; and
displaying the image during the first period of time based on a traversal of the node.

28. The non-transitory computer-readable medium of claim 27, wherein the process further comprises:
modifying the DOM tree to remove the node after the first period of time expires; and
rendering and displaying the content page based on a traversal of the modified DOM tree.

* * * * *